United States Patent [19]

Halls et al.

[11] Patent Number: 4,612,757

[45] Date of Patent: Sep. 23, 1986

[54] COMBINE HEADER ATTITUDE CONTROL MECHANISM

[75] Inventors: Lawrence M. Halls, New Holland; Edward J. Wynn, Leola, both of Pa.

[73] Assignee: Sperry Corporation, New Holland, Pa.

[21] Appl. No.: 722,952

[22] Filed: Apr. 12, 1985

[51] Int. Cl.⁴ ............................................. A01D 67/00
[52] U.S. Cl. ........................................ 56/10.2; 56/208
[58] Field of Search ................ 56/10.2, 208, 209, 210, 56/DIG. 15

[56] References Cited

U.S. PATENT DOCUMENTS

| | | | |
|---|---|---|---|
| 3,349,549 | 10/1967 | Van der Lely | 56/10.2 |
| 3,728,851 | 4/1973 | Van Antwerp | 56/208 |
| 3,908,345 | 9/1975 | Oni et al. | 56/208 |
| 4,204,383 | 5/1980 | Milliken, Jr. | 56/10.2 |

*Primary Examiner*—Robert P. Swiatek
*Assistant Examiner*—David L. Tarnoff
*Attorney, Agent, or Firm*—Larry W. Miller; Frank A. Seemar; Darrell F. Marquette

[57] ABSTRACT

A mechanism for controlling the attitude of a crop harvesting header mounted on a combine base unit for movement in a generally vertical direction and for rotational movement in a generally vertical plane to permit the header to follow changes in the ground contour is disclosed wherein a sensor bar is mounted on each respective side of the center line of the header to sense the location of the ground with respect to the corresponding end of the header. The header is provided with hydraulic lift cylinders and tilt cylinders to operably move the header vertically or rotationally. The control mechanism operably interconnects the sensor bars and the lift and tilt cylinders to effect movement of the header in response to a predetermined pattern of movement of the sensor bars.

17 Claims, 9 Drawing Figures

COMBINE HEADER ATTITUDE CONTROL MECHANISM

BACKGROUND OF THE INVENTION

The present invention relates generally to crop harvesting headers attachable to a combine to initiate the crop harvesting process and, more particularly, to a control mechanism for operably controlling the lifting and tilting of the header in response to the sensing of the ground relative to the header to permit the header to follow changing ground contours.

For some crops, such as soybeans, it is necessary to keep the cutterbar of the crop harvesting header as close to the ground as possible without permitting the cutterbar to impact into the ground. The lateral float attachment mechanism for combine headers described in U.S. Pat. No. 4,253,295, granted to Larimer J. Knepper on Mar. 3, 1981, provides the capability for the combine header to be pivotally rotated about a centrally located pivot axis. The provision of a tilt cylinder between the header cradle assembly and the feederhouse provides the capability of rotatably moving the header during the harvesting operation thereof.

A combination of the movements of the header lift cylinders operably interconnecting the combine frame and the header to provide a generally vertical movement of the header with the movements of the header tilt cylinder to provide a lateral floating movement permits the combine header to closely follow changing ground contours to maximize the efficiency of the harvesting operation for crops in which it is necessary for the header to closely follow the ground. It would be desirable then to provide a control mechanism to automatically control the operation of the header lift and tilt cylinders so that the combine header will follow change in ground contours without operator input.

SUMMARY OF THE INVENTION

It is an object of this invention to overcome the aforementioned disadvantages of the prior art by providing a control mechanism for a combine header mounted for both vertical and lateral floating movements to permit the header to follow changing ground contours.

It is another object of this invention to provide a control mechanism to permit the combine header to automatically follow changing ground contours without the need for operator input.

It is still another object of this invention to provide a ground sensing mechanism having separate sensor bars to sense the relative ground location to each side of the center line of the combine header.

It is yet another object of this invention to provide a control mechanism to control the attitude of a combine header in response to a predetermined pattern of movement of a pair of sensor bars mounted on opposing sides of the header center line.

It is a feature of this invention that each sensor bar has at least one finger projecting outwardly therefrom to affect a rotation of the respective sensor bar in response to a relative movement of the ground relative thereto.

It is another feature of this invention that the control means includes a pair of rotatable cam members movable in response to the rotation of the corresponding sensor bar to activate switches to control the operation of the header lift and tilt cylinders.

It is an advantage of this invention that the cam members and switches are mounted in a common housing for pivotal movement about a common pivot axis.

It is another advantage of this invention that the sensor bar fingers are engageable with ground engaging shoes to effect rotation of the corresponding sensor bar in response to the highest point of ground elevation on the respective side of the header center line.

It is yet another object of this invention to provide a control mechanism for controlling the attitude of a crop harvesting header which is durable in construction, inexpensive of manufacture, carefree of maintenance, facile in assemblage and simple and effective in use.

These and other objects, features and advantages are accomplished according to the instant invention by providing a mechanism for controlling the attitude of a crop harvesting header mounted on a combine base unit for movement in a generally vertical direction and for rotational movement in a generally vertical plane to permit the header to follow changes in the ground contour wherein a sensor bar is mounted on each respective side of the center line of the header to sense the location of the ground with respect to the corresponding end of the header. The header is provided with hydraulic lift cylinders and tilt cylinders to operably move the header vertically or rotationally. The control mechanism operably interconnects the sensor bars and the lift and tilt cylinders to effect movement of the header in response to a predetermined pattern of movement of the sensor bars.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
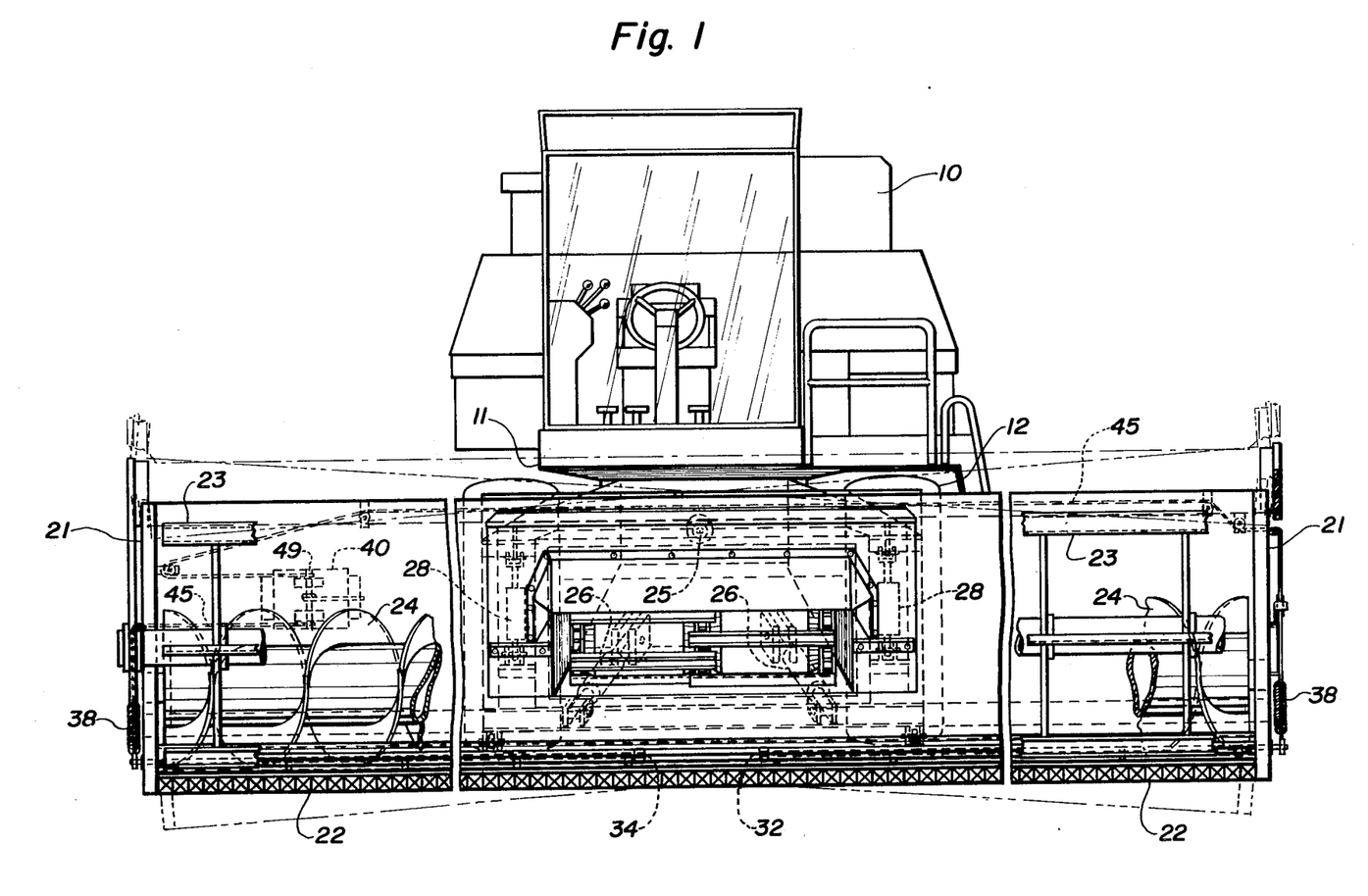
FIG. 1 is a front elevational view of a combine with a crop harvesting header mounted thereon and incorporating the principles of the instant invention, conventional drive mechanisms and other selected elements not relating to the present invention have been omitted to simplfy the drawings.

Referring now to the drawings and, particularly, to FIG. 1, a front elevational view of a combine having a crop harvesting header attached thereto can be seen. Any left and right references are used as a matter of convenience and are determined by standing at the rear of the machine, facing the forward end, the direction of travel. The combine base unit 10 is of generally conventional construction with a main frame 11 having ground engaging wheels 12 to mobilely support the combine 10 over the ground G.

Figure 2:
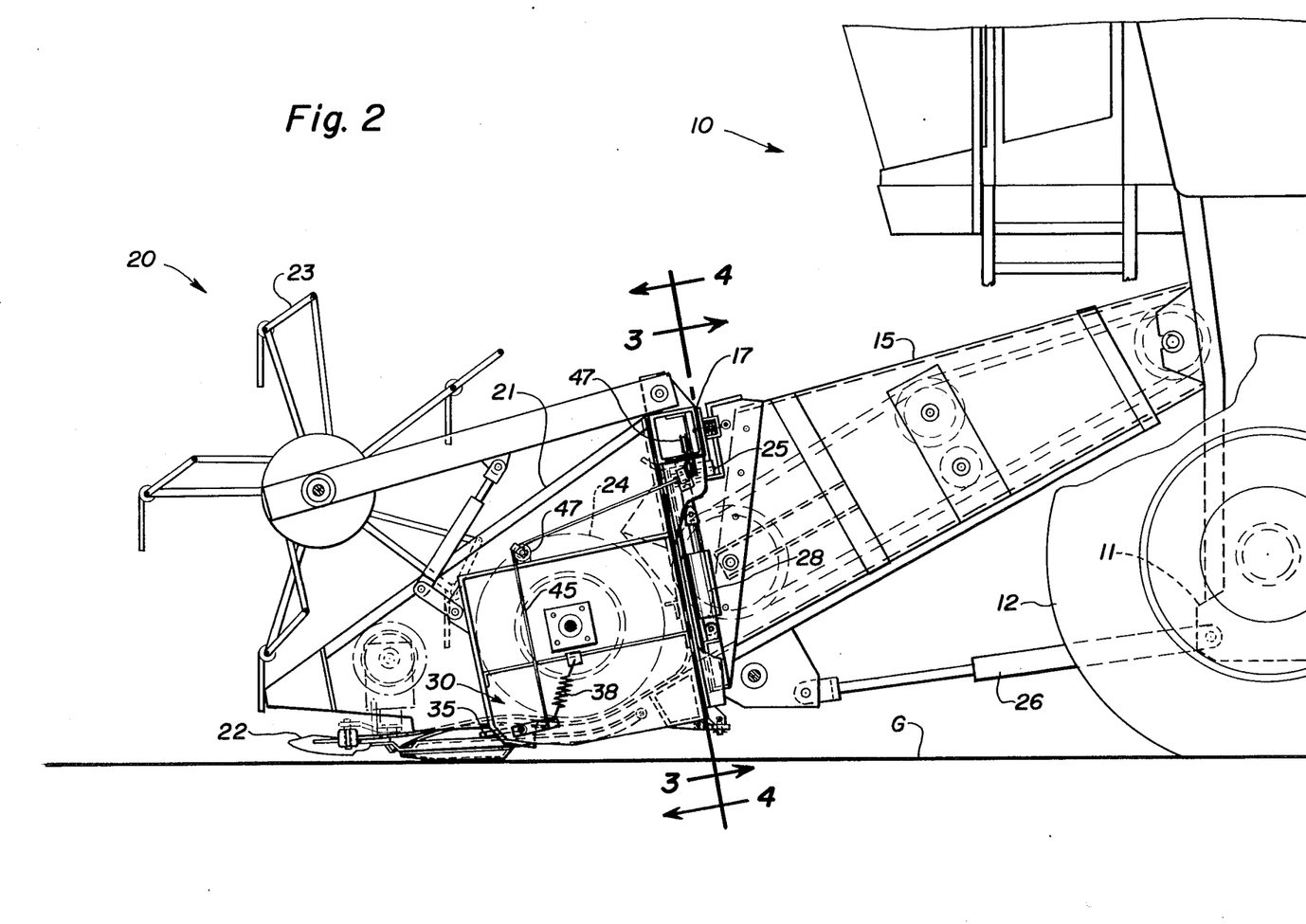
FIG. 2 is an enlarged fragmentary side elevational view of the combine seen in FIG. 1, showing the left side of the crop harvesting header and feederhouse.

As is best seen in FIGS. 1 and 2, the combine 10 is provided with a feederhouse 15 projecting forwardly therefrom to deliver crop material thereto. As is described in greater detail in U.S. Pat. No. 4,253,295, granted to Larimer J. Knepper on Mar. 3, 1981, the description of which is incorporated herein by reference, the feederhouse 15 is provided with a cradle assembly 17 to pivotally support the crop harvesting header 20 in a forwardly extending crop engaging position to initiate the crop harvesting process. The drawings depict a flexible crop harvesting header which is described in greater detail in U.S. Pat. No. 4,414,793, granted to L. M. Halls on Nov. 15, 1983, the description of which is incorporated herein by reference, including a transversely extending cutterbar 22, a reel 23 to engage the standing crop material and sweep it rearwardly over the cutterbar 22 and an auger 24 to consolidate the harvested crop material and convey it rearwardly into the feederhouse 15.

Figure 3:
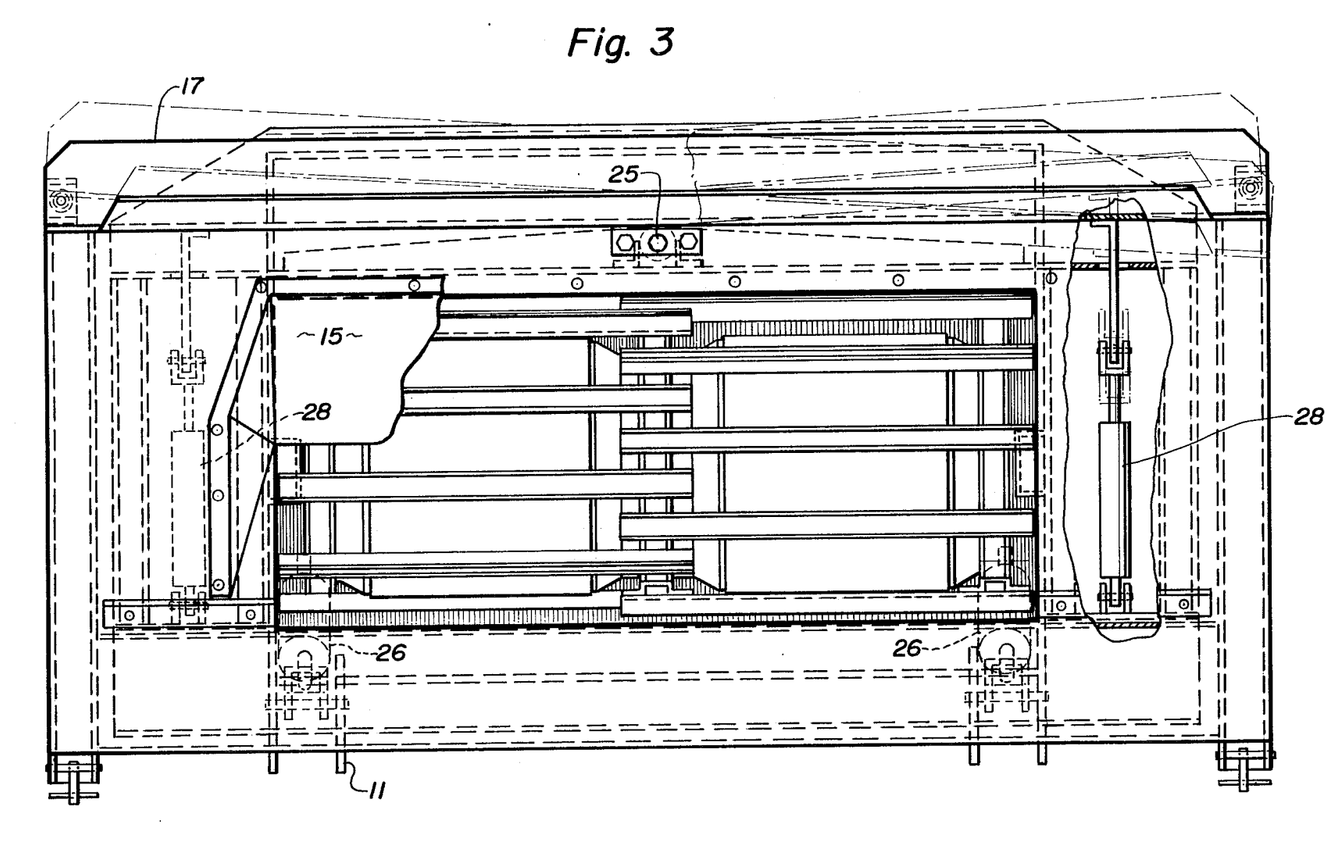
FIG. 3 is an enlarged front elevational view of the feederhouse with the crop harvesting removed therefrom, as indicated by the lines 3—3 of FIG. 2.

The header 20 is supported on the cradle assembly 17 for rotational movement in a generally vertical plane about the fore-and-aft extending pivot axis 25. A pair of transversely spaced hydraulic lift cylinders 26 interconnecting the combine frame 11 and the feederhouse 15 provides a source of power to vertically lift the header 20 relative to the ground G. A hydraulic tilt cylinder 28 disposed between the feederhouse 15 and the cradle assembly 17 provides a source of power for rotating the header about the pivot axis 25 to provide a lateral floating movement to the header 20. It should be noted that a single double acting cylinder 28 could be provided to pivotally rotate the header 20; however, it is preferable to provide a pair of transversely spaced tilt cylinders 28 on opposite sides of the pivot axis 25 to provide this rotational movement, which is best shown in the enlarged view of the feederhouse in FIG. 3.

Referring now to FIGS. 1, 4, 5 and 6, the ground sensing mechanism 30 can best be seen. The ground sensing mechanism 30 includes a left sensor bar 32 and a right sensor bar 34 mounted on opposing sides of the center line of the crop harvesting header 20. Each sensor bar 32,34 includes a plurality of fingers 35 rigidly affixed thereto and projecting outwardly therefrom for engagement with ground engaging shoes 36 transversely spaced along the width of the header 20. As the ground engaging shoes 36 move with the ground G, the fingers 35, which are spring loaded into engagement with the ground engaging shoes 36 by springs 38, follow the movement of the corresponding ground engaging shoe 36 and affect a corresponding rotation of the corresponding sensor bar 32 or 34. Since the fingers 35 are rigidly affixed to the sensor bars 32,34, each sensor bar 32,34 is controlled by the highest point of ground between the header center line and the corresponding side sheet 21.

Figure 4:
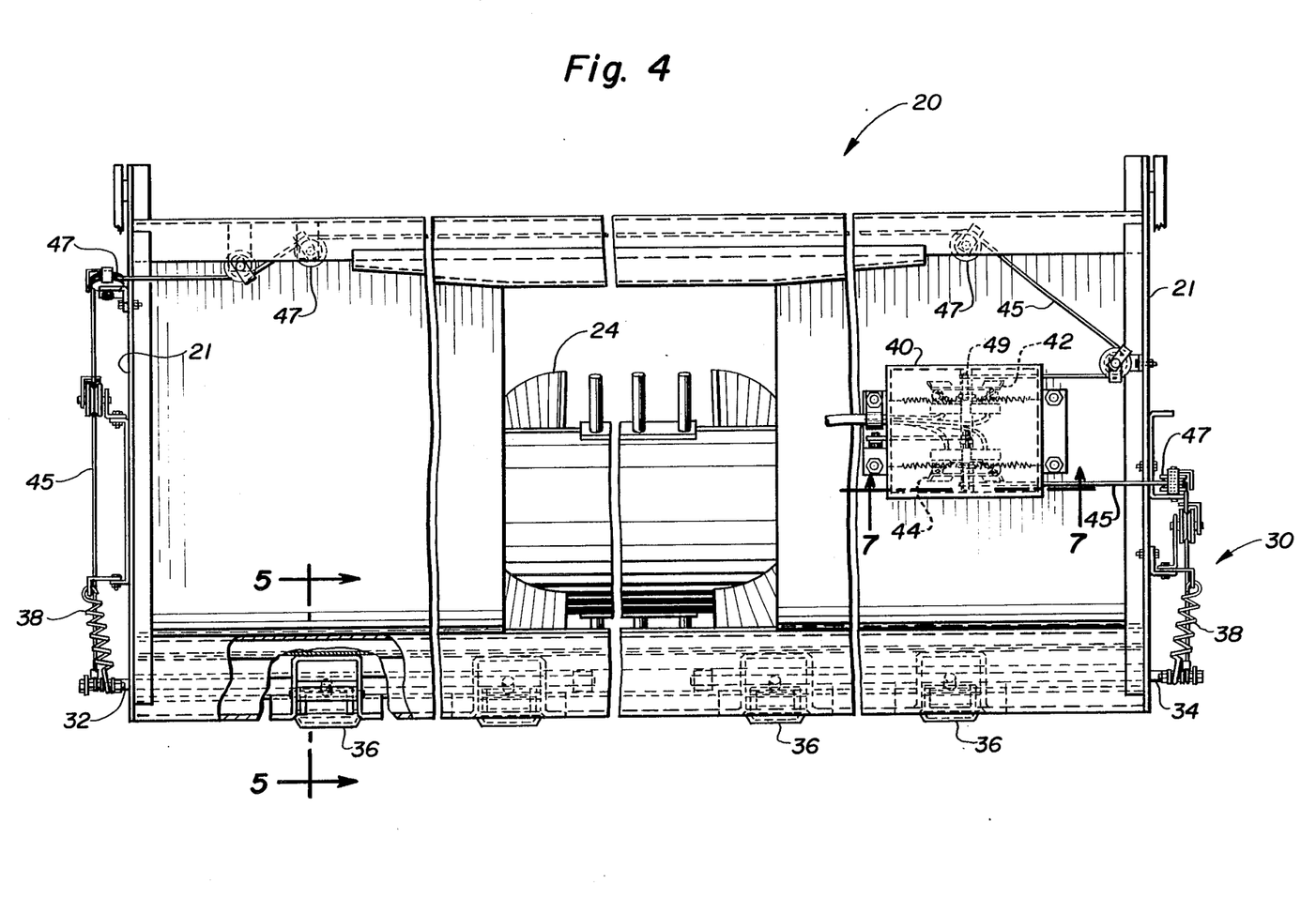
FIG. 4 is a rear elevational view of the crop harvesting header corresponding to lines 4—4 of FIG. 2, portions of the header being broken out to shorten the view and portions of the structure being broken away to clarify various structural details.
Figure 5:
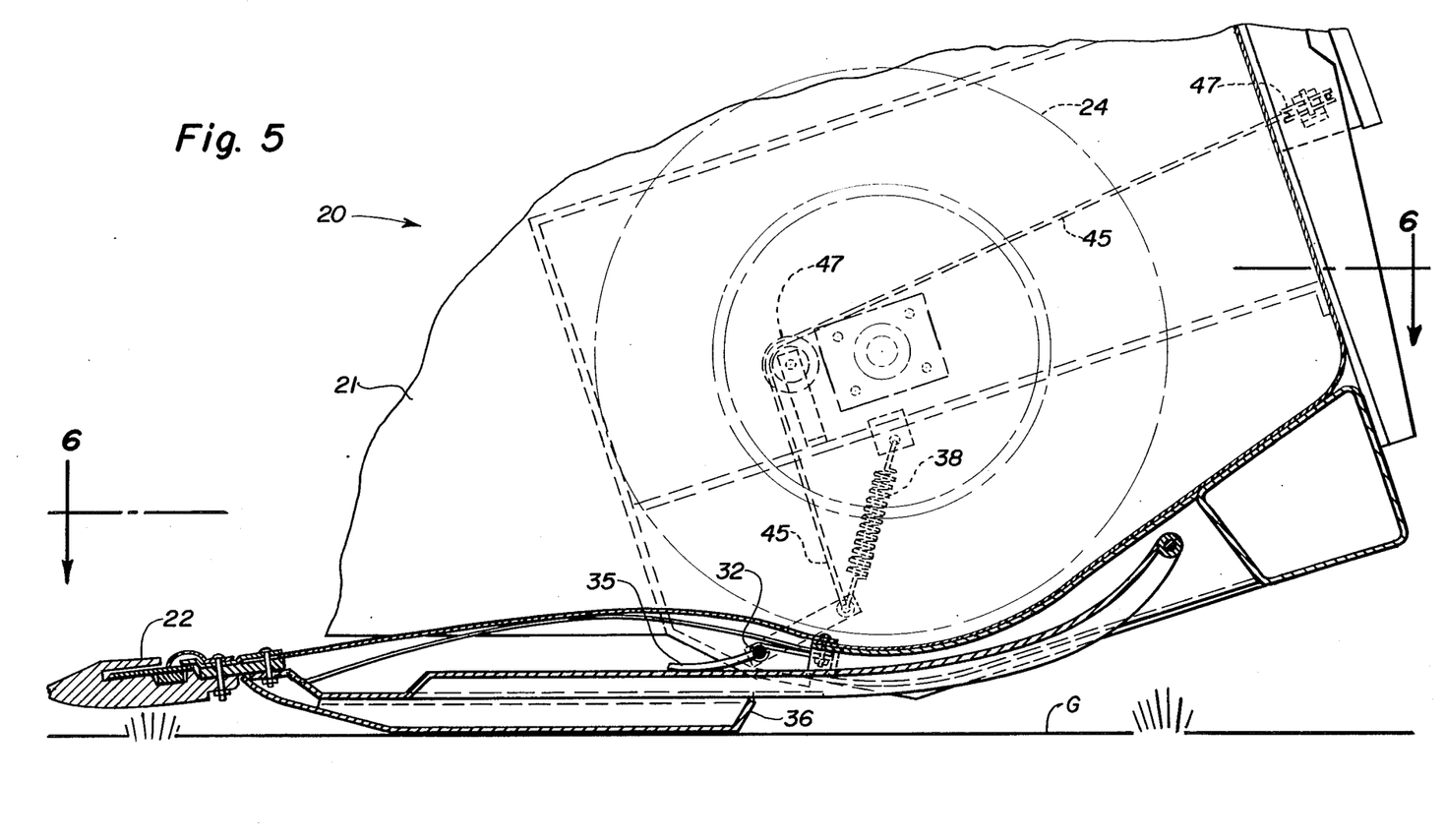
FIG. 5 is an enlarged partial cross-sectional view taken along lines 5—5 of FIG. 4.
Figure 6:
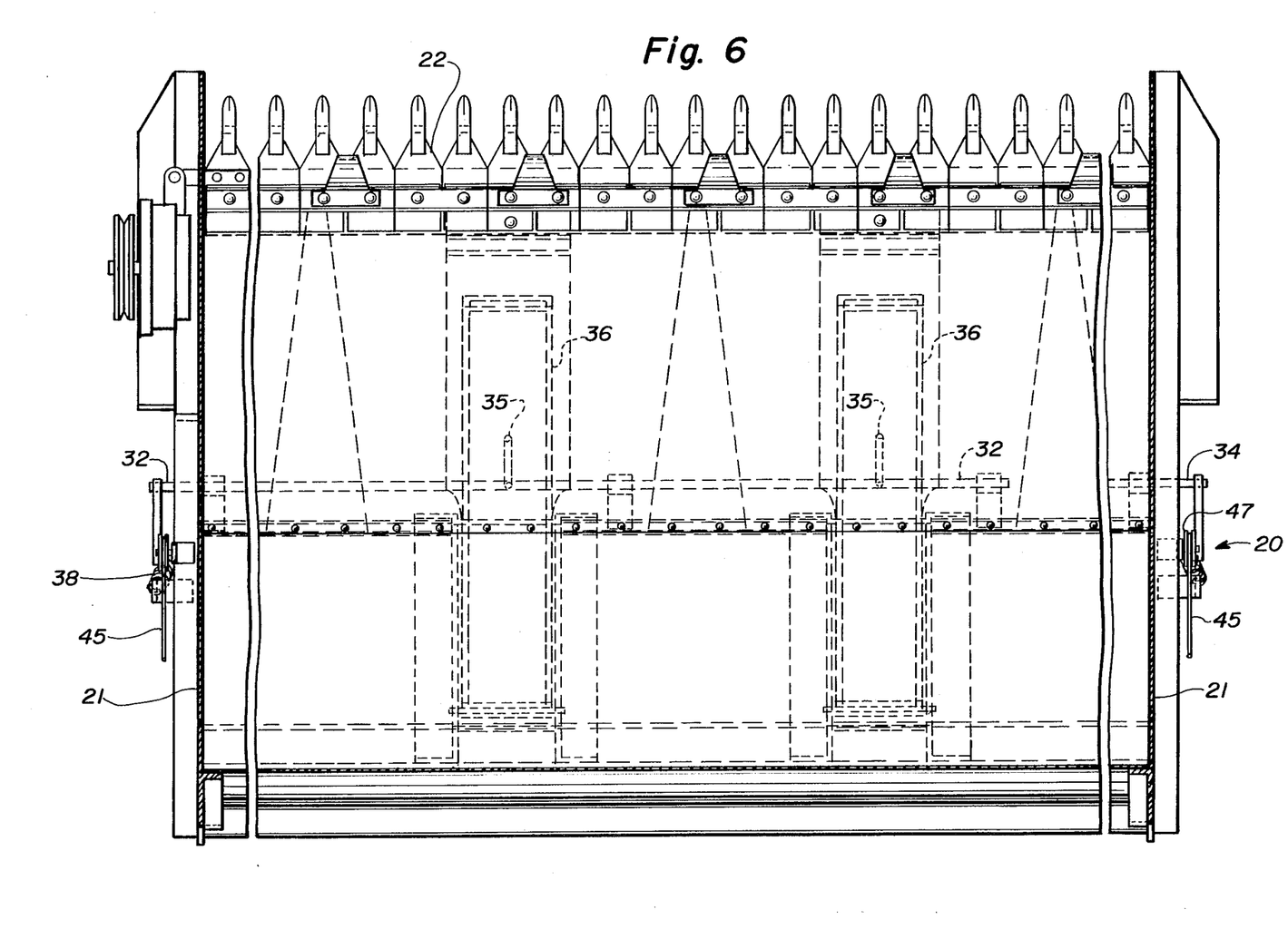
FIG. 6 is a fragmentary cross-sectional view of the header taken along lines 6—6 of FIG. 5.
Figure 7:
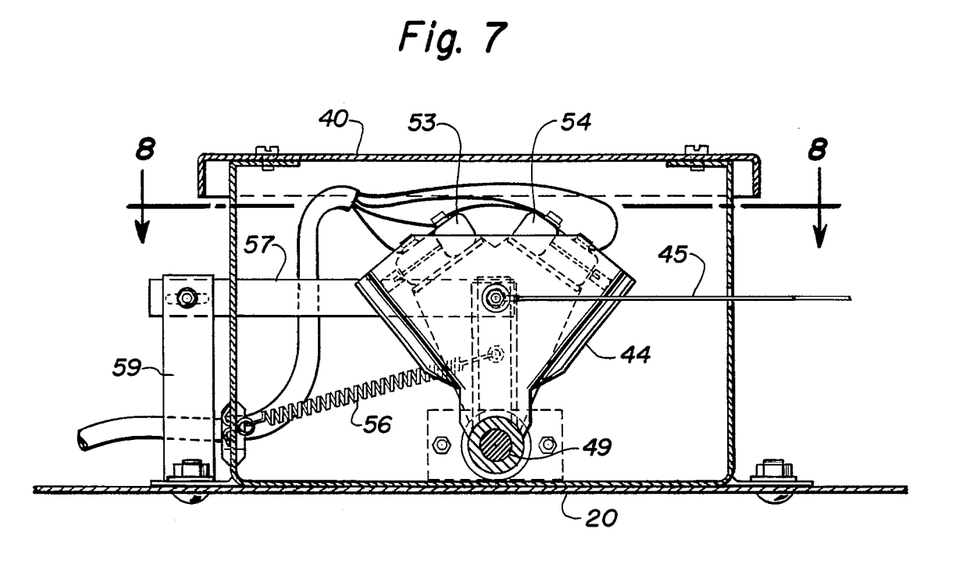
FIG. 7 is a cross-sectional view of the control box taken along lines 7—7 of FIG. 4.
Figure 8:
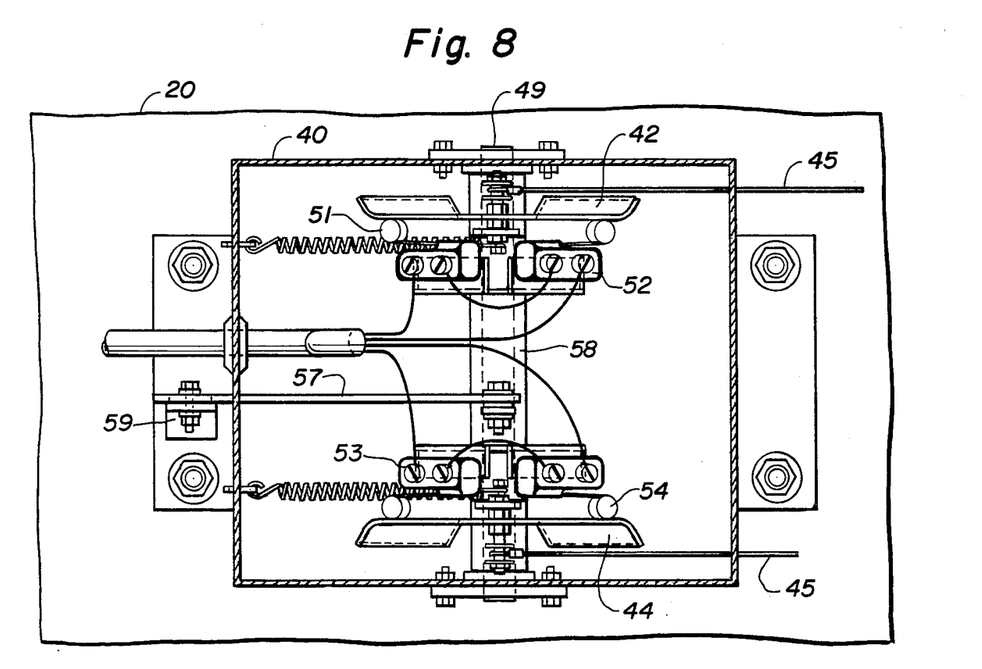
FIG. 8 is a cross-sectional view through the control box corresponding to lines 8—8 of FIG. 7.

The rotational movement of the sensor bars 32,34, caused by the movement of the fingers 35 following the ground engaging shoes 36, is transferred to a corresponding cam member 42,44 mounted within a control box 40 by flexible cables 45 guided by appropriately positioned pulleys 47. The structural details of the control box 40 and the associated cam members 42,44 are best seen in FIGS. 4, 7 and 8. The control box 40 is physically mounted to the back of the header 20. A cam member 42 corresponding to the left sensor bar and a cam member 44 corresponding to the right sensor bar are mounted on a common pivot axis 49 within the box 40. The rotation of the corresponding sensor bars 32,34 affects a pivotal movement of the cam members 42,44 about the pivot axis 49 independently of each other. Also mounted on the pivot axis 49 are two pairs of electrical switches 51,52 and 53,54 engageable with the corresponding cam member 42,44 to affect actuation thereof when the corresponding cam member 42,44 is rotating in opposing directions.

As best seen in FIGS. 7 and 8, the cables 45 are used to rotate the corresponding cam member 42,44 against the bias exerted by corresponding biasing springs 56. These biasing springs 56 will affect rotation of the corresponding cam member 42,44 when the corresponding sensor bar 32,34 rotates sufficiently to permit a relaxing of the corresponding cable 45. Although the switches 51,52,53,54 are mounted on the same pivot axis 49 as the cam members 42,44, the switches are rotatable for adjustment only independently of the rotation of either cam member 42,44. An adjustment link 57 interconnects the sleeve 58 on which the switches 51,52,53,54 are mounted and an adjustment bracket 59 having a slotted hole therein fixes the position of the adjustment line 57. The movement of the adjustment link relative to the adjustment bracket 59 affects a slight rotation of the sleeve 58 to positionally move the switches 51,52,53,54 in unison relative to the cam members 42,44 to increase or decrease sensitivity of the actuation of the switches relative to the corresponding rotation of the cam members 42,44.

Figure 9:
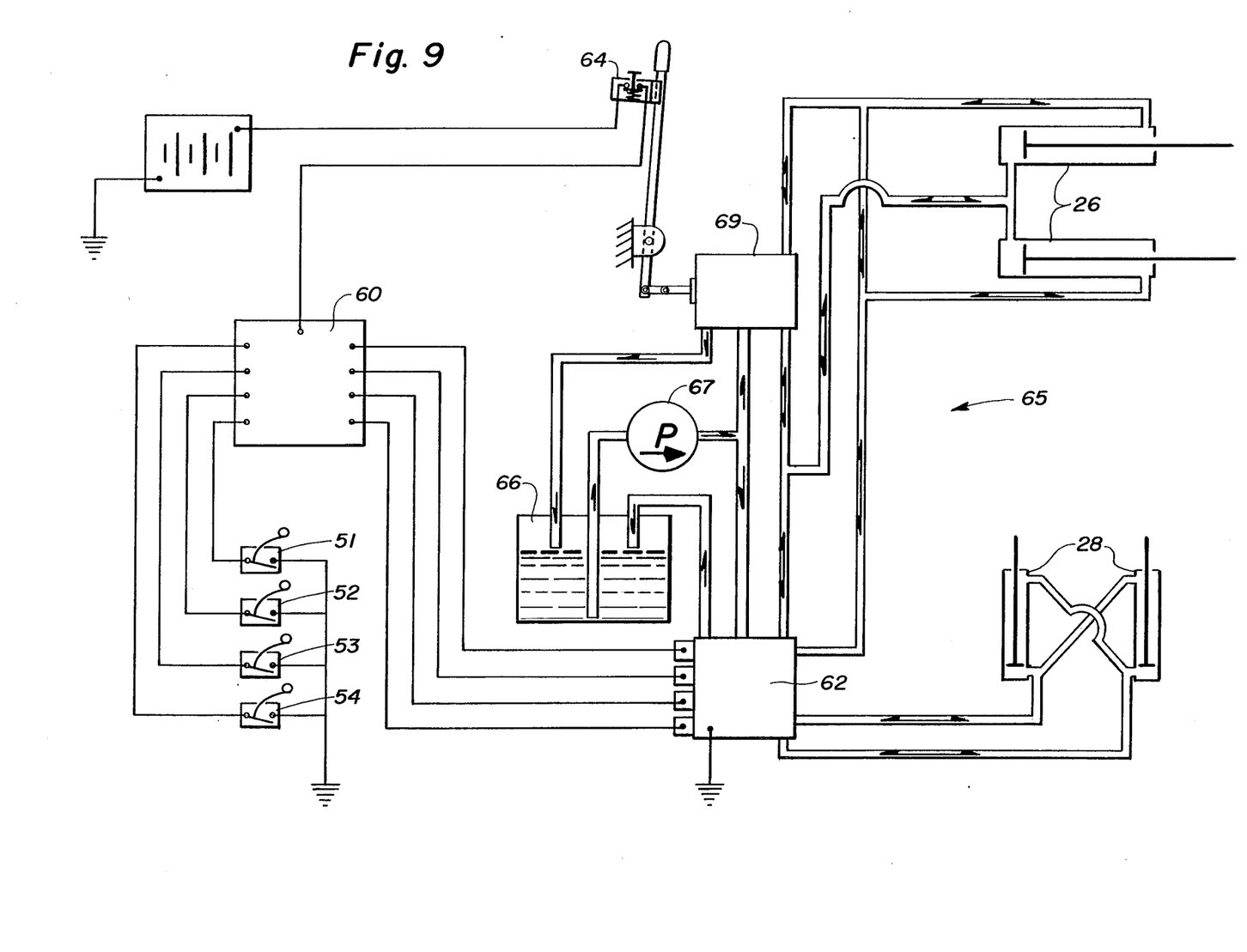
FIG. 9 is a schematic diagram of the electric and hydraulic circuits forming a part of the instant invention.

As best seen in FIGS. 7-9, the switches 51,52,53,54 are arranged such that the rotation of a cam member 42,44 in one direction will actuate one of the switches, while rotation of that cam member in the opposing direction will actuate the other switch of the pair corresponding to that cam member. For example, the rotation of the left sensor bar 32 to cause a pulling on the associated cable 45 affects a rotation of the cam member 42 to the right as seen in FIGS. 7 and 8 to effect an actuation of switch 51. Conversely, the rotation of the left sensor bar 32 to permit a relaxing of the associated cable 45 permits the associated spring 56 to rotate the cam member 42 toward the left as seen in FIGS. 7 and 8 to effect an actuation of switch 52. The actuation of the individual switches 51,52,53,54 sends an electrical current to a printed circuit unit 60 which processes the signals received in these switches and sends a current to a solenoid control valve 62 controlling the operation of the lift and tilt cylinders.

As shown in FIG. 9, the electrical circuit includes a master on and off switch 64 which controls the flow of current to the electrical circuit including the printed circuit unit 60. The hydraulic system 65 includes a conventional hydraulic reservoir 66 and a pump 67 to provide a source of hydraulic fluid under pressure through lines to the lift cylinders 26 and the tilt cylinders 28. The solenoid control valve 62 controls the flow of hydraulic fluid through the lines to the lift cylinders 26 and the tilt cylinders 28 individually or simultaneously. The hydraulic system also includes a manually actuatable lift valve 69 to permit an actuation of the lift cylinders 26 by the operator as an override to the control mechanism described above.

Referring now to all the drawings, the operation of the control mechanism for controlling the attitude of the crop harvesting header to follow changing ground contours can be seen. When the ground G is rising across the entire transverse width of the header 20, the ground engaging shoes 36 will rise affecting a rotation of both the left and right sensor bars 32,34 to cause a pulling on the associated cables 45. As a result, both the cam members 42,44 will be pivoted to the right as seen in FIGS. 7 and 8 against the biasing exerted by the springs 56 to affect an actuation of switches 51 and 53. The corresponding electrical signal sent to the printed circuit unit affects an operation of the solenoid control valve 62 to send hydraulic fluid under pressure to the lift cylinders 26 to cause a raising of the header 20. Conversely, a dropping of the ground across the entire transverse width of the header 20 permits a relaxing of both cables 45 to permit the springs 56 to rotate the cam members 42,44 to the left as seen in FIGS. 7 and 8, causing an actuation of switches 52,54. The resultant electrical signal through the printed circuit unit 60 actuates the solenoid valve 62 to send fluid under pressure to the lift cylinders 26 to lower the header 20.

Similarly, a changing of ground contours to necessitate a lateral floating movement of the header 20, i.e., a rotation of the header 20 about its pivot axis 25 affected by the tilt cylinders 28, will send a different pattern of signals from the switches to the printed circuit unit 60 and, consequently, affect an operation of a solenoid control valve 62 to operate the tilt cylinder 28. For example, a changing of ground contours to increase a downhill slope to the right will raise the ground engaging shoes 36 along the left side of the header and a lowering of the ground engaging shoes 36 along the right side of the header 20. As a result, the left sensor bar 32 will pull on the associated cable 45 to affect a rotation of the cam member 42 to the right as seen in FIGS. 7 and 8, actuating switch 51, while the relaxing of the cable 45 associated with the right sensor bar 34 will permit the associated spring 56 to rotate the cam member 44 to the left as seen in FIGS. 7 and 8, actuating switch 54. This pattern of electrical signals to the printed circuit unit 60 will result in an output therefrom to the solenoid control valve 60 to send hydraulic fluid under pressure to the tilt cylinders 28 to affect a clockwise rotation of the header 20 about the pivot axis 25 to permit the header to follow the change in ground contour.

A continual changing of signal input from the switches 51,52,53,54 to the printed circuit unit 60 affects an on-the-go changing of the operation of the header lift cylinders 26 and tilt cylinders 28 to permit an automatic following of the ground contours by the header 20. A return of the cam members 42,44 to a neutral position, which is depicted in FIGS. 7 and 8, results in a lack of electrical signal being sent to the printed circuit unit 60, which in turn results in a freezing of the positioning of the lift and tilt cylinders 26,28. The cam members 42,44 are positioned in this neutral position whenever the ground G is at a preselected position relative to the header 20, irrespective of the position of the header 20 relative to the combine 10. As a result, this control mechanism will raise, lower and/or tilt either clockwise or counterclockwise the header 20 to seek a preselected attitude of the header 20 to the ground G. As one skilled in the art will readily realize, this seeking of a preselected attitude is done automatically without operator input.

It will be understood that changes in the details, materials, steps and arrangement of parts which have been described and illustrated to explain the nature of the invention will occur to any may be made by those skilled in the art upon a reading of this disclousre within the principles and scope of the invention. The foregoing description illustrates the preferred embodiment of the invention; hwoever, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine harvester having a mobile frame adapted for movement over a field, crop harvesting means supported by said frame to harvest crop material delivered thereto; crop feeding means operatively associated with said crop harvesting means to deliver crop material thereto; a transversely extending crop gathering header operatively connected to said crop feeding means to gather crop material from said field and convey said crop material to said crop feeding means, said header having first and second tranversely spaced sidewalls and a longitudinally extending center line substantially equidistantly between said sidesheets and being supported from said frame for transverse tilting movement relative to said frame to permit said header to follow transversely changing ground contours and for vertical movement relative to said frame to permit said header to follow longitudinal elevational changes in ground contours; header lift means operatively associated with said header to power said vertical movement; header tilt means operatively associated with said header to power said transverse tilting movement; sensor means supported by said header to sense changes in the ground contours; and control means operatively interconnecting said sensor means and said header lift means and said header tilt means for actuation thereof to permit said header to follow changing ground contours in response to the sensing of said changing ground contours by said sensor means, an improved sensor means comprising:

a first sensor bar substantially extending between said first header sidewall and said centerline and being rotatably mounted for rotational movement in first and second opposing directions in response to changes in ground contour between said first sidewall and said centerline;

a second sensor bar substantially extending between said second sidewall and said centerline and being rotatably mounted for rotational movement in first and second opposing directions in response to changes in ground contour between said second sidewall and said centerline independently of said first sensor bar; and each said sensor bar having a plurality of fingers projecting therefrom to follow the highest contour of the ground beneath the respective said sensor bar and effect rotation thereof, said control means being operatively connected to said first and second sensor bars to effect operation of said header lift means when said first and second sensor bars are rotated in like directions and to effect operation of said header tilt means when said first and second sensor bars are rotated in opposite directions and when only one of said sensor bars is rotated.

2. The combine harvester of claim 1 wherein said control means includes first and second cam members pivotally supported for movement in opposing directions within corresponding planes and being operatively connected to said first and second sensor bar, respectively, each said cam member being pivotally moved in response to a rotation of the corresponding said sensor bar.

3. The combine harvester of claim 2 wherein each said cam member is in operative communication with a pair of switches, each said switch corresponding to one of the directions of pivotal movement of the respective said cam member and is actuated when said cam member is moved in the corresponding direction from a neutral position in response to a corresponding movement of the respective sensor bar.

4. The combine harvester of claim 3 wherein said control means further includes a solenoid control valve operatively connected to said header lift means and said header tilt means to control the operation thereof, said control means further including a processor unit operatively connected to both said switches and said solenoid control valve to receive signals from said switches, determine the pattern of movement of said sensor bars and selectively control the operation of said solenoid control valve which, in turn, controls the operation of said header tilt means and said header lift means.

5. The combine harvester of claim 4 wherein said first and second cam members are mounted on a common pivot axis; the pivotal movement of each said cam member being biased in one of said opposing directions of movement by a spring, each said cam member being connected to the corresponding sensor bar by a flexible link to effect pivotal movement of said cam members in response to the rotational movement of the corresponding said sensor bars.

6. The combine harvester of claim 5 wherein said switches are mounted on a pivot axis for movement relative to the corresponding cam member to vary the necessary position required of said cam members to actuate the corresponding switches.

7. The combine harvester of claim 6 wherein both said cam members and said switches are pivotally mounted on a common pivot axis.

8. The combine harvester of claim 6 wherein said fingers are transversely spaced along the length of the respective said sensor bar, each said finger being ridgedly fixed to the corresponding said sensor bar.

9. The combine harvester of claim 8 wherein said header is transversely flexible and includes a plurality of transversely spaced ground engaging members pivotally supported on said header and free to follow changing ground contours, each said finger being associated with one of said ground engaging members, the rotation of each said sensor bar being controlled by the highest of the respective ground engaging members along the corresponding side of said header.

10. The combine harvester of claim 9 wherein each said sensor bar is spring loaded toward engagement with said ground engaging shoes.

11. A header height and lateral float actuating mechanism for a combine harvester having a frame; crop harvesting header supported by said frame for generally rotational transverse movement and generally vertical movement relative to said frame; header tilt means for powering said rotational transverse movement of said header; and header lift means for powering said vertical movement of said header, comprising:

a left sensor bar having at least one finger projecting therefrom to follow changes in ground contour, said left sensor bar substantially extending from a generally longitudinally extending centerline to a left outboard end of said header and rotatably supported to permit a rotation thereof in first and second opposing directions in response to said at least one finger following changes in the highest ground controur between said left outboard end and said centerline;

a right sensor bar having at least one finger projecting therefrom to follow changes in ground contour, said right sensor bar substantially extending from said centerline to a right outboard end of said header and rotatably supported to permit a rotation thereof in first and second opposing directions in response to said at least one finger following changes in the highest ground contour between said centerline and said right outboard end; and control means operatively connected to said left and right sensor bars, said header lift means and said header tilt means, said control means actuating said header lift means when said left and right sensor bars are rotated in similar directions and actuating said header tilt means when said left and right sensor bars are rotated in non-similar directions to effect said vertical and rotational movements, respectively of said header to permit said header to follow changes in ground contour.

12. The actuating mechanism of claim 11 wherein said control means actuates said header lift means to effect said vertical movement of said header when both said left and right sensor bars are rotated in the same direction, said control means actuating said header tilt means to effect said transverse rotational movement when said left and right sensor bars are rotated in opposite directions and when only one of said sensor bars is rotated.

13. The actuating mechanism of claim 12 wherein said control means includes first and second cam members rotatably supported for rotational movement in opposing directions within corresponding planes, said first and second cam members being connected to said left and right sensor bars, respectively, for rotational movement in response to the rotational movement of the respective said sensor bar.

14. The actuating mechanism of claim 13 wherein each said sensor bar is provided with an outwardly extending tab adjacent the respective said outboard end, each said tab being connected to the corresponding said cam member by a cable to transfer rotational movement thereto, each said cam member being biased for rotation in one of said opposing directions by a spring.

15. The actuating mechanism of claim 13 wherein each said cam member is in operative communication with a pair of switches, each said switch corresponding to one of the directions of pivotal movement of the respective said cam member and is actuated when said cam member is moved in the corresponding direction from a neutral position in response to a corresponding movement of the said respective sensor bar.

16. The actuating mechanism of claim 15 wherein said control means further includes a solenoid control valve operatively connected to said header lift means and said header tilt means to control the operation thereof, said control means further including a processor unit operatively connected to both said switches and said solenoid control valve to receive signals from said switches, determine the pattern of movement of said sensor bars and selectively control the operation of said solenoid control valve which, in turn, controls the operation of said header tilt means and said header lift means.

17. The actuating mechanism of claim 16 wherein said cam members and each pair of corresponding switches are mounted on a common axis of rotation for rotational movement, said pairs of switches being rotatably movable relative to the corresponding said cam members to permit adjustment of the ncessary amount of rotational movement of said cam members to effect actuation of said switches.

* * * * *